(12) United States Patent
Yamada

(10) Patent No.: US 11,746,947 B2
(45) Date of Patent: Sep. 5, 2023

(54) STAND AND STAND SYSTEM

(71) Applicant: Masamichi Yamada, Kanagawa (JP)

(72) Inventor: Masamichi Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 214 days.

(21) Appl. No.: 17/164,984

(22) Filed: Feb. 2, 2021

(65) Prior Publication Data

US 2021/0247015 A1    Aug. 12, 2021

(30) Foreign Application Priority Data

Feb. 7, 2020  (JP) ................................. 2020-020096
Dec. 8, 2020  (JP) ................................. 2020-203378

(51) Int. Cl.
*F16M 11/04*    (2006.01)
*F16M 11/22*    (2006.01)
*F16M 11/42*    (2006.01)

(52) U.S. Cl.
CPC ........... *F16M 11/041* (2013.01); *F16M 11/22* (2013.01); *F16M 11/42* (2013.01)

(58) Field of Classification Search
CPC .... F16M 11/22; F16M 11/105; F16M 11/041; F16M 11/42
See application file for complete search history.

(56) References Cited

U.S. PATENT DOCUMENTS

| 7,738,243 | B2 | 6/2010 | Oshima |
| 11,421,815 | B2* | 8/2022 | Yamada ............... H05K 5/0204 |
| 2007/0153459 | A1 | 7/2007 | Wohlford et al. |
| 2012/0261362 | A1* | 10/2012 | Skull ..................... F16M 11/22 248/225.11 |

FOREIGN PATENT DOCUMENTS

| JP | H11-338363 | 12/1999 |
| JP | 2005-108974 | 4/2005 |
| JP | 2014-041309 | 3/2014 |
| JP | 6539952 | 7/2019 |
| WO | 2006/030487 | 3/2006 |

OTHER PUBLICATIONS

Extended European Search Report for 21154903.5 dated May 21, 2021.

* cited by examiner

*Primary Examiner* — Bradley Duckworth
(74) *Attorney, Agent, or Firm* — IPUSA, PLLC

(57) ABSTRACT

A stand for supporting a display device includes multiple posts and a mounting plate module configured to connect the posts to each other. The stand is configured such that a rotary unit is attachable to and detachable from the mounting plate module, the display device is attachable to the mounting plate module via the rotary unit and is also attachable to the mounting plate module without the rotary unit, and a position of the display device relative to the stand in a depth direction in a state where the display device is attached to the mounting plate module via the rotary unit is the same as the position of the display device relative to the stand in the depth direction in a state where the display device is attached to the mounting plate module without the rotary unit.

11 Claims, 12 Drawing Sheets

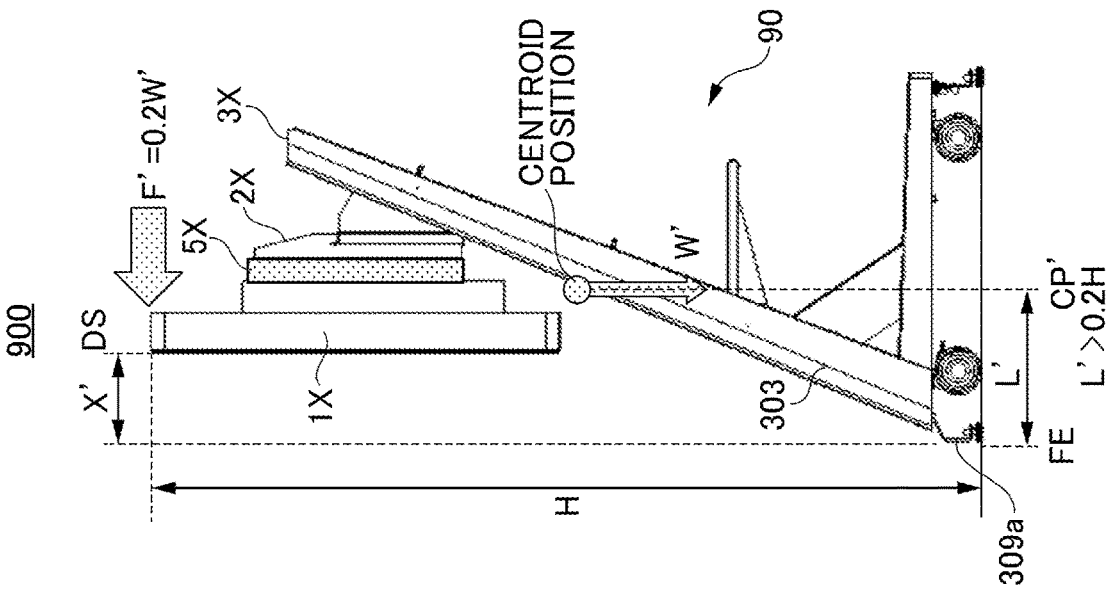
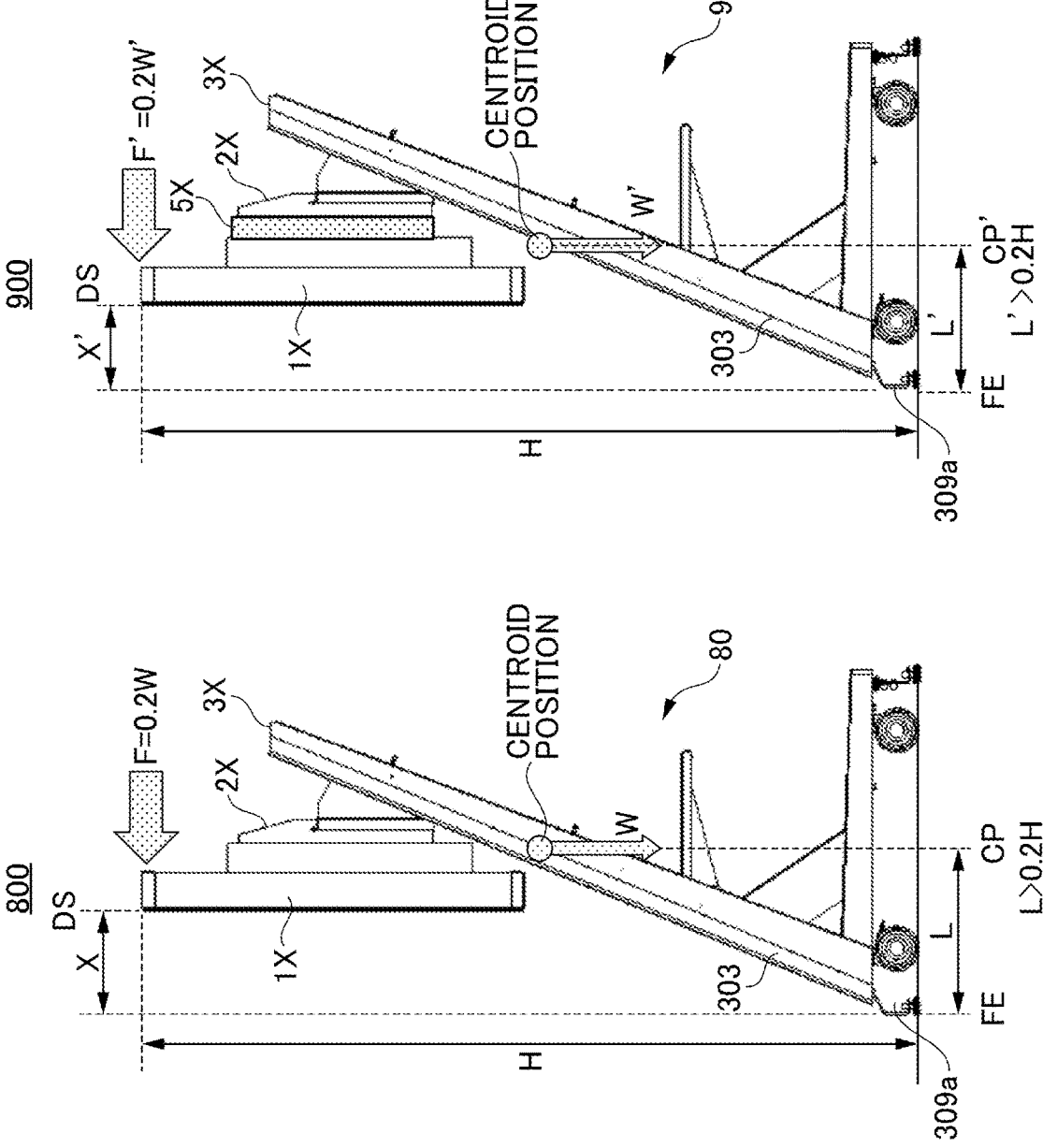

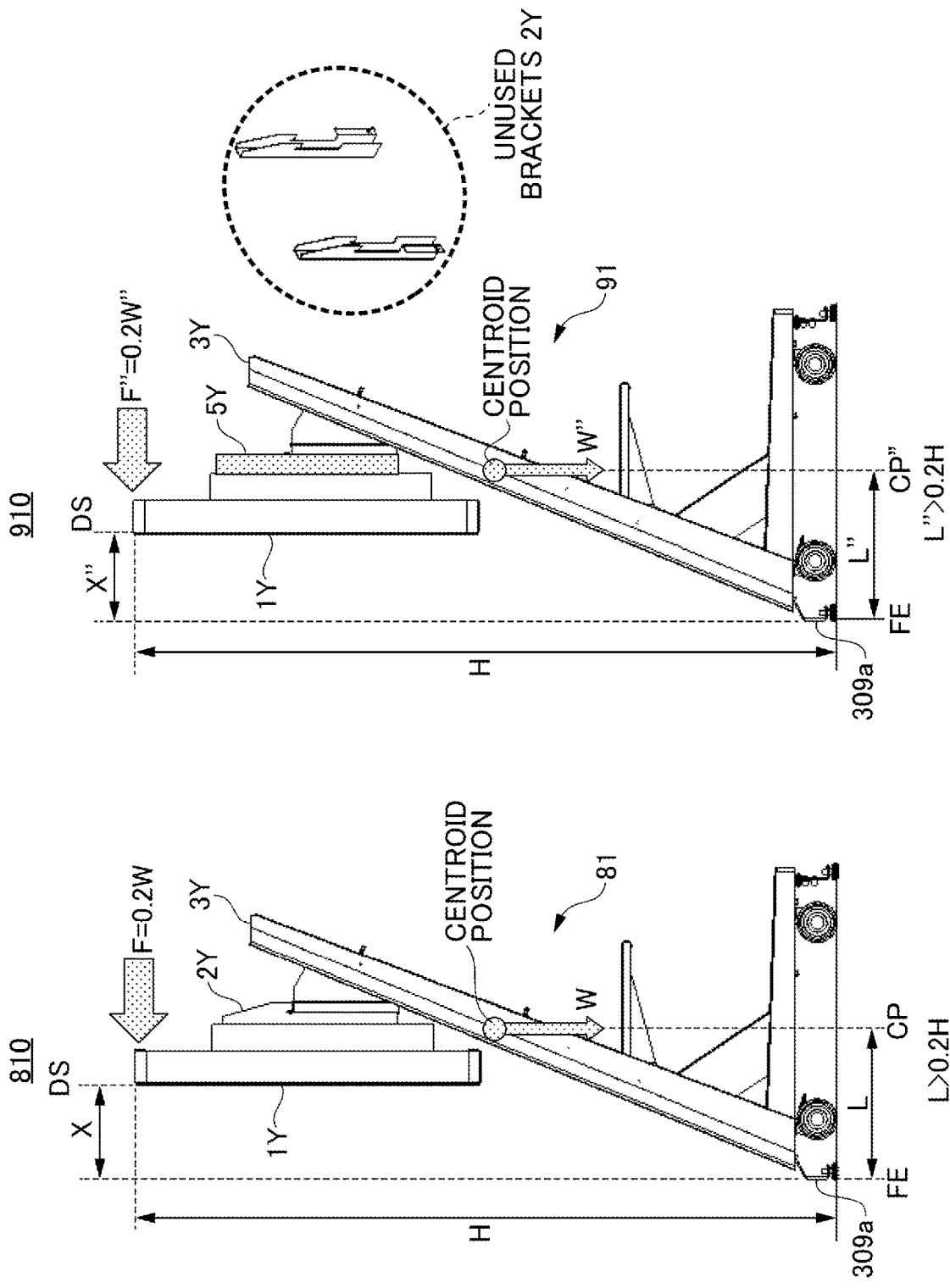

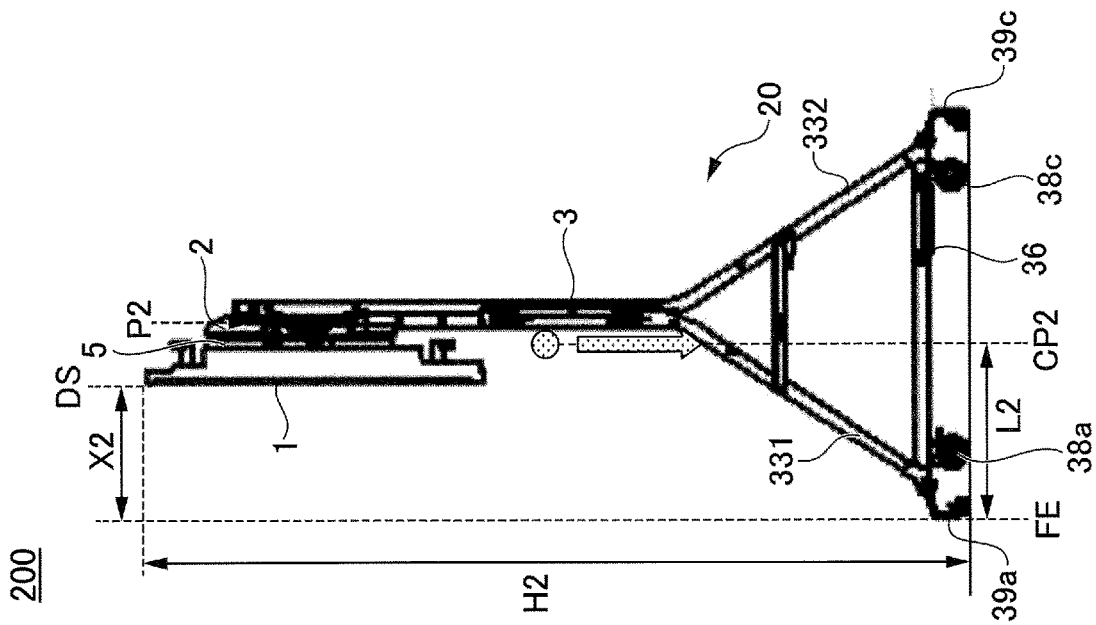
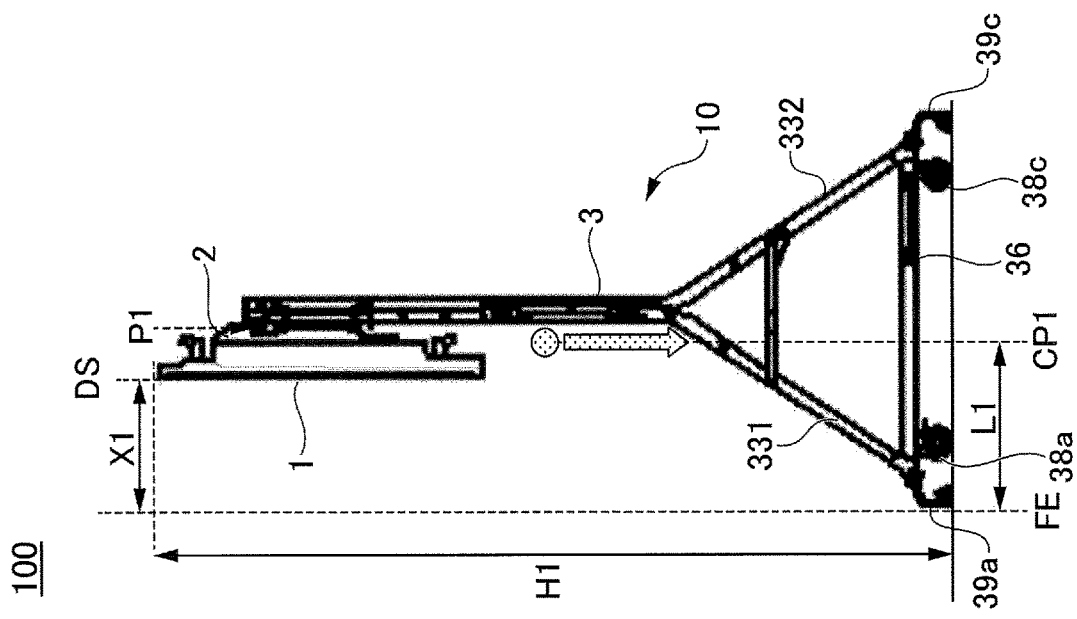

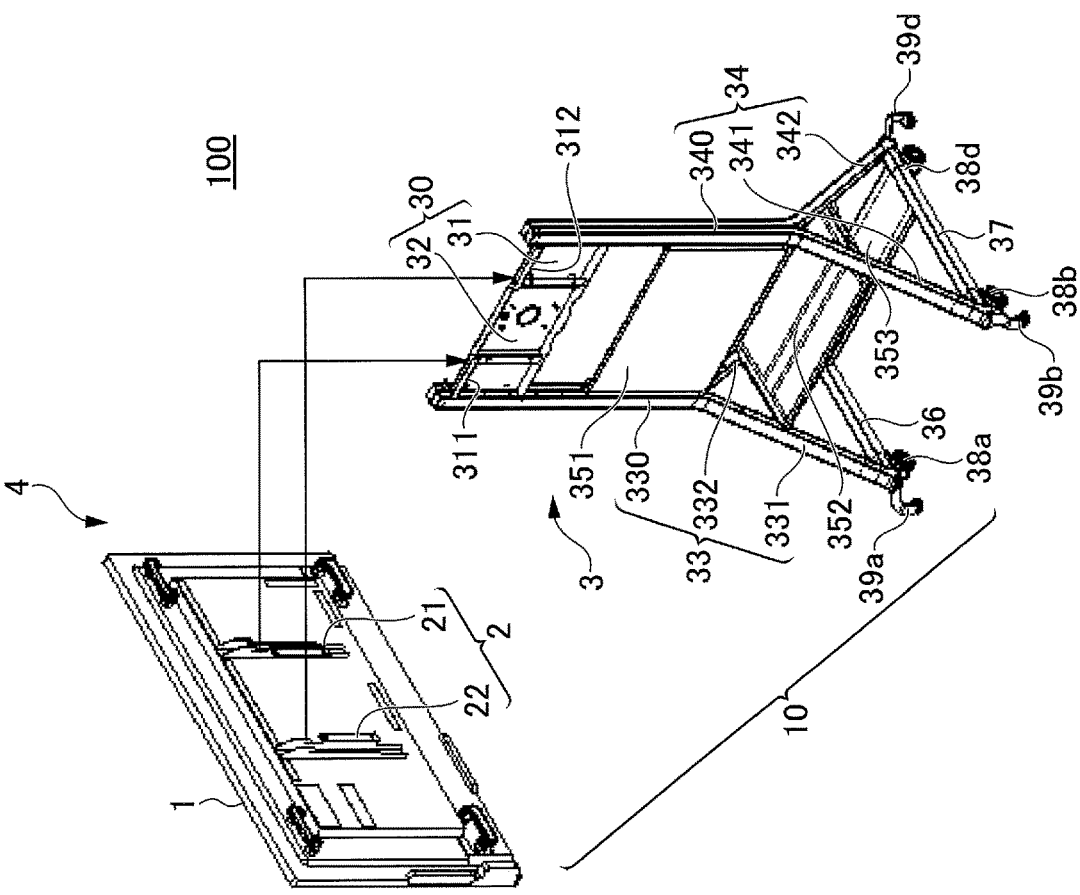
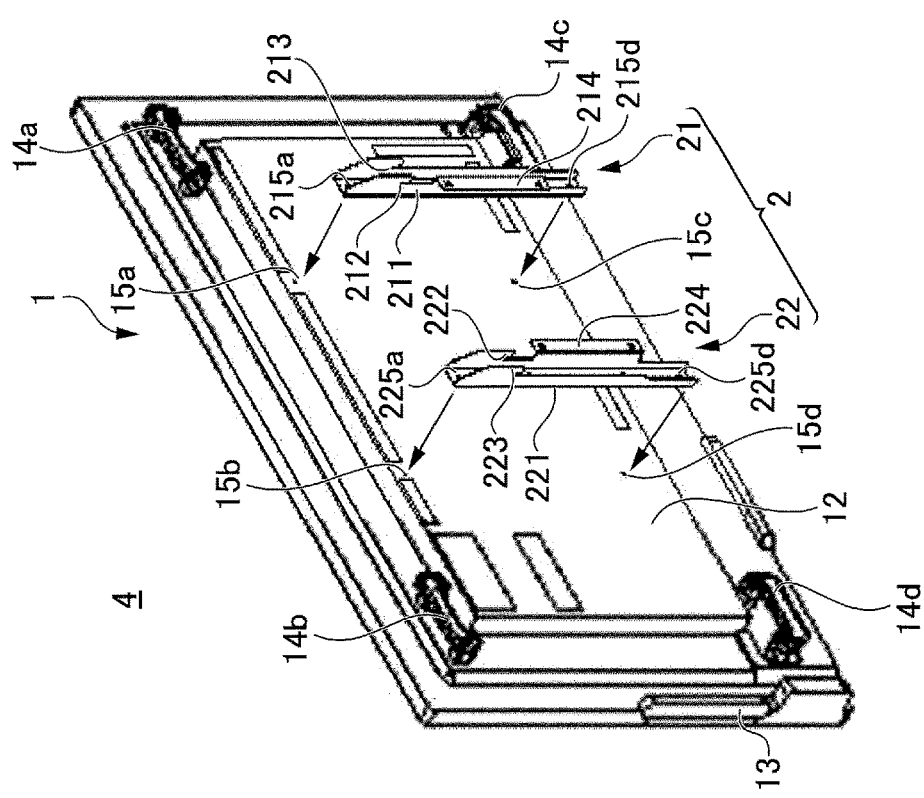

STAND AND STAND SYSTEM

CROSS-REFERENCE TO RELATED APPLICATIONS

The present application claims priority under 35 U.S.C. § 119 to Japanese Patent Application No. 2020-020096, filed on Feb. 7, 2020 and Japanese Patent Application No. 2020-203378, filed on Dec. 8, 2020, the contents of which are incorporated herein by reference in their entirety.

BACKGROUND OF THE INVENTION

1. Field of the Invention

An aspect of this disclosure relates to a stand and a stand system.

2. Description of the Related Art

Japanese Patent No. 6539952, for example, discloses a self-standing support stand for supporting a large display device (e.g., a display with a diagonal size greater than or equal to 30 inches, an interactive whiteboard, or an electronic blackboard).

In the support stand according to Japanese Patent No. 6539952, a heavy part is disposed in a lower rear position to place the center of mass (centroid) of the entire support stand in a lower rear position as far as possible so that the amount of protrusion of front legs with respect to the screen of a display device is reduced and the installation space for the support stand is thereby reduced.

Here, in recent years, the usage of large display devices by users has increased, and there is an increasing demand for a stand that enables manually changing the orientation of a display device to a landscape orientation (horizontal orientation) or a portrait orientation (vertical orientation).

Therefore, a rotary unit that enables the rotation of a display device is provided as an optional product to meet the demand of users.

SUMMARY OF THE INVENTION

According to an aspect of this disclosure, there is provided a stand for supporting a display device. The stand includes multiple posts and a mounting plate module configured to connect the posts to each other. The stand is configured such that a rotary unit is attachable to and detachable from the mounting plate module, the rotary unit being configured to enable manually changing an orientation of the display device between a landscape orientation and a portrait orientation without detaching and reattaching the display device from the stand, the display device is attachable to the mounting plate module via the rotary unit and is also attachable to the mounting plate module without the rotary unit, and a position of the display device relative to the stand in a depth direction in a state where the display device is attached to the mounting plate module via the rotary unit is the same as the position of the display device relative to the stand in the depth direction in a state where the display device is attached to the mounting plate module without the rotary unit.

BRIEF DESCRIPTION OF THE DRAWINGS

FIGS. 1A and 1B are side views of stand systems according to a first comparative example;

FIGS. 2A and 2B are side views of stand systems according to a second comparative example;

FIGS. 4A and 4B are side views of stand systems according to an embodiment;

FIGS. 5A and 5B are drawings illustrating assembly of a stand system in a case where a rotary unit is not attached;

DESCRIPTION OF THE EMBODIMENTS

Figure 3:
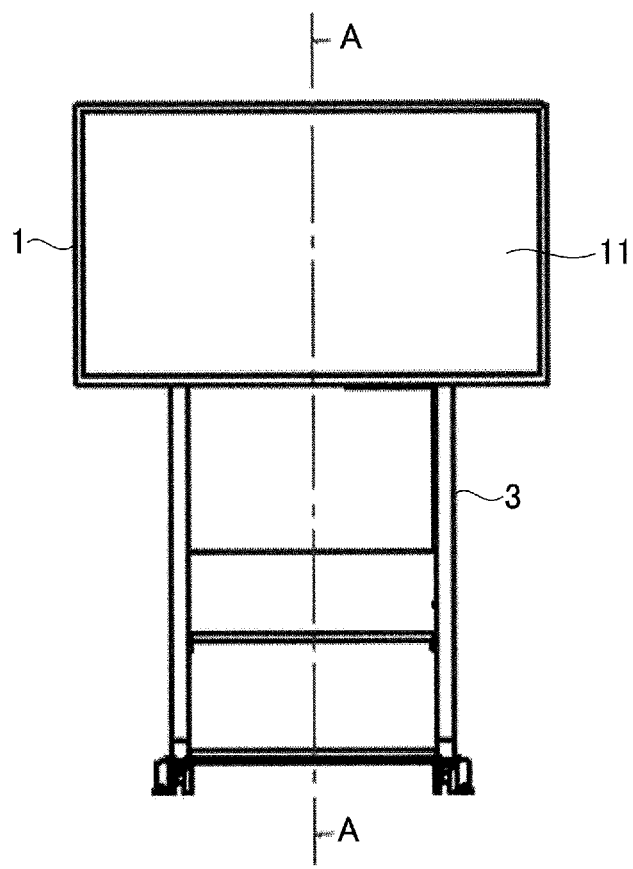
FIG. 3 is an elevational view of a stand system according to an embodiment.

An aspect of this disclosure provides a stand that supports a display device and is configured such that the stand remains stable even when a rotary unit is attached and the front legs of posts do not obstruct user operations even when the rotary unit is not attached.

Embodiments of the present invention are described below with reference to the accompanying drawings. Throughout the specification and the accompanying drawings, the same reference number is assigned to components having substantially the same function and configuration, and repeated descriptions of those components may be omitted.

An aspect of this disclosure relates to a stand for supporting a display and a stand system including the stand.

Examples of displays that can be supported by the stand of this disclosure may include analog boards such as a whiteboard, a blackboard, and a canvas; display devices capable of receiving inputs, i.e., electronic panels, such as an interactive whiteboard (IWB), an interactive flat panel display, and a touch panel; and passive display devices such as a monitor and a television.

COMPARATIVE EXAMPLES

First Comparative Example

FIGS. 1A and 1B are side views of stand systems according to a first comparative example. FIG. 1A illustrates a stand system 800 of the first comparative example in which a display 1X is supported by a stand 80 without a rotary unit, and FIG. 1B illustrates a stand system 900 in which the display 1X is supported by a stand 90 via a rotary unit 5X.

In Japan, stands for supporting large displays are legally required to comply with the product safety standard IEC60950. Specifically, the standard requires that a stand "shall not fall even when pushed in the horizontal direction at the highest position not exceeding 2 m with a force that is 20% of the total load".

To comply with this requirement, a distance L from a centroid position CP in FIG. 1A to a front end FE of a caster stopper 309a below a front leg 303, which is the outermost ground contact point in the load direction, needs to be greater than or equal to 20% of the maximum height H. That is, "distance L>0.2×maximum height H" needs to be satisfied.

However, in terms of usability by the user, the distance L in FIG. 1A is preferably as short as possible. As the distance L decreases, a distance X from a display screen DS of the display 1X to the front end FE of the front leg decreases, and the front leg 303 becomes less likely to obstruct the operation (such as a handwriting operation) of the user on the screen. Therefore, in the dedicated display stand 80 illustrated in FIG. 1A, the distance L is made as short as possible within a range that satisfies the IEC60950 standard.

However, when an optional rotary unit 5X is attached to the dedicated stand 80 (which is then referred to as the stand 90), the display 1X is shifted forward by an amount corresponding to the thickness of the rotary unit 5X as illustrated in FIG. 1B and a centroid position CP' is also shifted forward. As a result, a distance L' from the centroid position CP' to the front end FE becomes shorter than the distance L. Accordingly, when the rotary unit 5X is attached to the dedicated stand 80 in which the distance L is set at the smallest possible value, the centroid position CP' moves forward and the shortened distance L' becomes less than or equal to 0.2H (L'≤0.2H). As a result, the stability is reduced.

In contrast, if the distance L' from the centroid position CP' to the front end FE is set to satisfy the relationship L'>0.2H taking into account the attachment of the rotary unit 5X, the distance L becomes unnecessarily long when the rotary unit 5X is not attached. In this case, the distance L becomes significantly greater than 0.2H when the rotary unit 5X is not attached, and the front leg 303 becomes an obstacle to an operation (such as a handwriting operation) of the user on the display 1X.

To avoid the above problems, the rotary unit 5X may be attached in place of a mounting bracket 2X, that is, the rotary unit 5X may be attached to a position from which the bracket 2X is removed, so that the forward movement of the display 1X resulting from the attachment of the rotary unit 5X is minimized.

Second Comparative Example

FIGS. 2A and 2B are side views of stand systems according to a second comparative example. FIG. 2A illustrates a stand system 810 of the second comparative example in which a display 1Y is supported by a stand 81 using mounting brackets 2Y and without attaching a rotary unit, and FIG. 2B illustrates a stand system 910 where the display 1Y is supported by a stand 91 via a rotary unit 5Y and the mounting brackets 2Y are detached.

When the mounting brackets 2Y are detached and replaced with the rotary unit 5Y as illustrated in FIG. 2B, the thickness of the rotary unit 5Y is added, but the thickness of the mounting bracket 2Y is deducted. Accordingly, the centroid position CP''' is substantially the same as the centroid position CP in FIG. 2A. Therefore, a distance L'' from the centroid position CP''' to the front end FE is almost the same as the distance L in the case where the display 1Y is supported by the mounting brackets 2Y (L≈L'').

As a result, a distance X'' from the display screen DS to the front end FE of the front leg in FIG. 2B becomes substantially the same as the distance X from the display screen DS to the front end FE of the front leg in FIG. 2A (X≈X''), and the IEC standard is satisfied regardless of whether the rotary unit 5Y is attached. Accordingly, with both of the configurations illustrated in FIGS. 2A and 2B, the front leg 303 does not much obstruct user operations (such as a handwriting operation) on the display 1Y.

However, when the stand system is assembled as illustrated in FIG. 2B, the mounting brackets 2Y originally provided in the stand become unnecessary and need to be discarded. Also, when it is expected that the rotary unit 5Y is detached after the stand system is assembled as illustrated in FIG. 2B, the mounting brackets 2Y will be needed again and it is bothersome to store the mounting brackets 2Y so as not to lose them.

One aspect of this disclosure makes it possible to solve the above problems.

EMBODIMENTS

FIG. 3 is an elevational view of a stand system according to an embodiment. FIGS. 4A and 4B are cross-sectional views taken along line A-A of FIG. 3.

FIG. 4A illustrates a stand system 100 according to an embodiment where a display 1 is supported by a stand 10 without a rotary unit, and FIG. 4B illustrates a stand system 200 of the embodiment where the display 1 is supported by a stand 20 via a rotary unit 5.

Specifically, as illustrated in FIG. 4A and FIG. 4B, each of the stands 10 and 20 of the present embodiment includes a stand mechanism 3 and brackets 2 (brackets 21 and 22).

In the present embodiment, the rotary unit 5 is an optional component that is attachable to the display 1 and/or the stand 10/20 (mounting plate module 30) and allows the orientation of the supported display 1 to be manually changed between a landscape orientation in which the longer side of the supported display 1 extends horizontally and a portrait orientation in which the longer side of the supported display 1 extends vertically, without detaching and reattaching the display 1.

Thus, the stand 10/20 of the present embodiment is configured such that the display 1 may be attached to the stand mechanism 3 without the rotary unit 5 as illustrated in FIG. 4A and may also be attached to the stand mechanism 3 via the rotary unit 5 as illustrated in FIG. 4B.

In the descriptions below, a state where the display 1 (display device) is attached to the stand 10 (display stand) without the rotary unit 5 is referred to as the stand system 100 (display stand system), and a state where the display 1 is attached to the stand 20 (display stand) via the rotary unit 5 is referred to as the stand system 200 (display stand system). In other words, the stand systems 100 and 200 designate different states of a stand system.

In the stand mechanism 3, a caster stopper 39a provided below a front leg 331 is the frontmost end of the stand. Details of the stand mechanism 3 are described later with reference to FIGS. 5A and 5B.

As illustrated in FIG. 4A, when the display 1 is attached without the optional rotary unit 5, the brackets 2 are attached directly to the display 1, and the display 1 is attached to a mounting position P1 of the stand mechanism 3 via the brackets 2.

As illustrated in FIG. 4B, when the display 1 is attached via the optional rotary unit 5, the brackets 2 (mounting brackets) also used in FIG. 4A are attached to the rotary unit 5, and the brackets 2 are then fitted to the stand mechanism 3 such that the display 1 is attached to a mounting position P2.

Although the configuration of the stand mechanism 3 is described later with reference to FIG. 5, the front end face of the caster stopper 39a provided below the front leg 331 becomes the front end FE that is the frontmost end of the stand mechanism 3.

Comparing FIG. 4A and FIG. 4B, the mounting position P2 illustrated in FIG. 4B in the case where the rotary unit 5 is attached is located closer to the rear end than the mounting position P1 illustrated in FIG. 4A in the case where the rotary unit 5 is not attached.

With this configuration, although the distance from the mounting position on the stand mechanism 3 to the display 1 is increased by an amount corresponding to the thickness of the rotary unit 5 when the rotary unit 5 is attached as illustrated in FIG. 4B, because the mounting position P2 is closer to the rear end than the mounting position P1, a centroid position CP2 in FIG. 4B is substantially the same as a centroid position CP1 in FIG. 4A. Therefore, a distance L2 from the centroid position CP2 to the front end FE of the base of the stand mechanism 3 is substantially the same as a distance L1 from the centroid position CP1 to the front end FE in the case where the brackets 2 are attached directly to the display 1 (L1≈L2).

With the above configuration, the position of the screen of the display relative to the stand is substantially the same regardless of whether the optional rotary unit is used. The expression "the position of the screen of the display relative to the stand is substantially the same" not only indicates that the mounting position of the display relative to the stand is exactly the same regardless of whether the rotary unit is used, but also indicates a case where there is a slight positional difference (within a few cm).

That is, with the above configuration, a distance X1 from the display screen DS of the display 1 to the front end FE of the caster stopper 39a below the front leg 331 in FIG. 4A can be made substantially the same as a distance X2 from the display screen DS of the display 1 to the front end FE of the caster stopper 39a below the front leg 331 in FIG. 4B (X1≈X2).

Also, in both of the cases of FIG. 4A and FIG. 4B, the brackets 2 are used to attach the display 1. With this configuration, even when the rotary unit 5 is attached, the brackets 2 can be used effectively, and there is no need to store the brackets 2.

<Assembly>

Methods of attaching the display to the stand according to the present embodiment are described below with reference to FIGS. 5A through 6C.

Figure 6C:
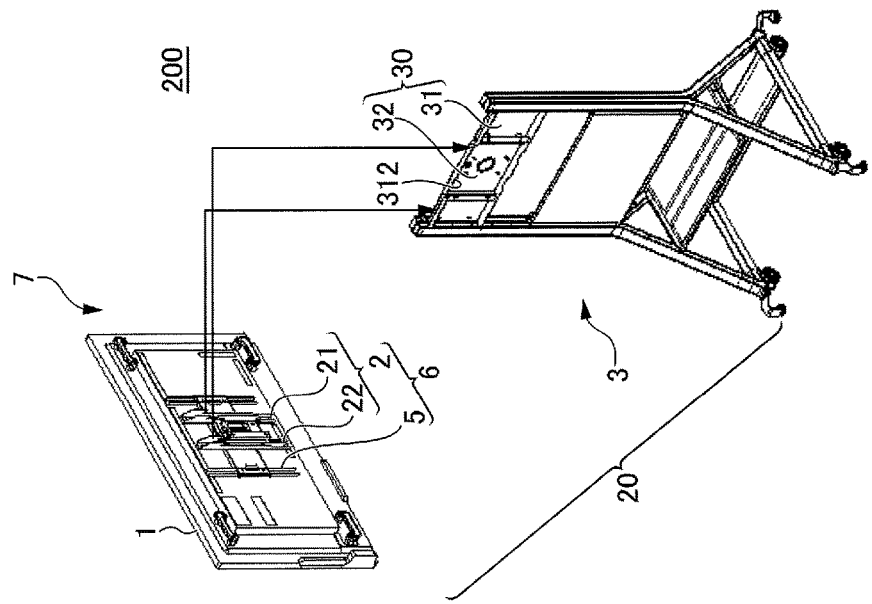
FIGS. 6A through 6C are drawings illustrating assembly of a stand system in a case where a rotary unit is attached.
Figure 6A:
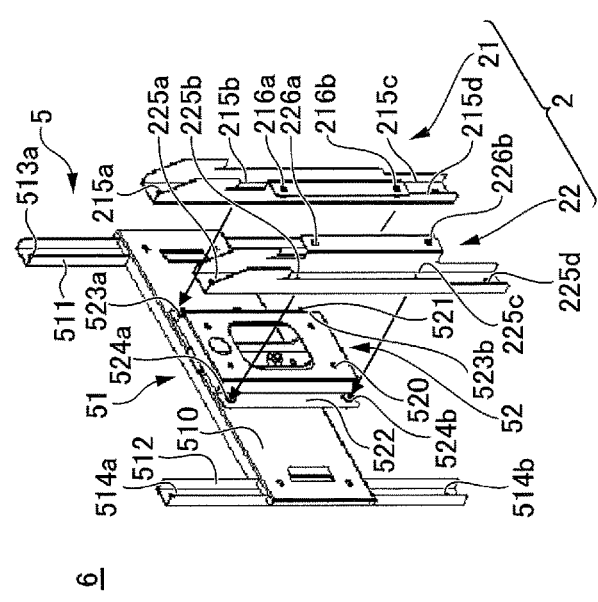
Figure 6B:
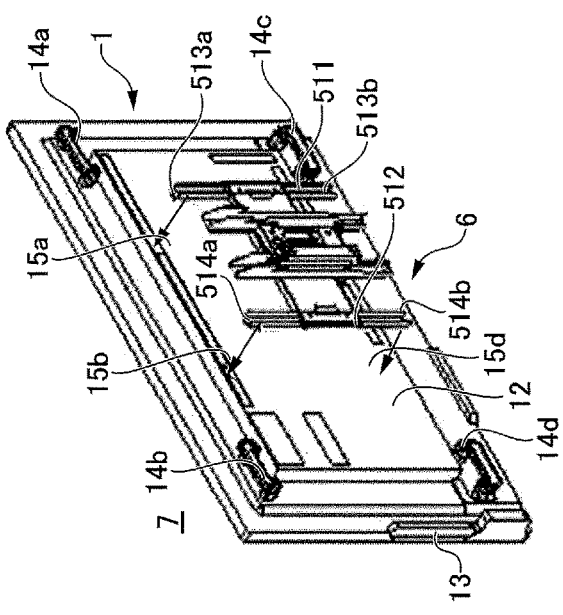

FIGS. 5A and 5B are drawings for explaining the assembly of the stand system 100 according to the present embodiment where the rotary unit 5 is not attached, and FIGS. 6A through 6C are drawings for explaining the assembly of the stand system 200 according to the present embodiment where the rotary unit 5 is attached.

As illustrated in FIGS. 5A and 5B, when the display 1 is attached without the rotary unit 5, the brackets 21 and 22 are attached to the back side of the display 1, and then the brackets 21 and 22 are fitted to the mounting plate module 30 of the stand mechanism 3.

Specifically, as illustrated in FIG. 5A, the display 1 includes a display surface 11 (see FIG. 3) and a back side 12, and an operation unit 13 is provided on the lateral side of the display 1. Handles 14a, 14b, 14c, and 14d are provided at the four corners of the back side 12. Four screw holes 15a, 15b, 15c, and 15d are formed in the central area of the back side 12.

The back sides of the brackets 2 can be fitted to the mounting plate module 30 of the stand mechanism 3, and the front sides of the brackets 2 can be attached to either the display 1 or the rotary unit 5. The brackets 2 include a pair of right and left brackets 21 and 22.

Each bracket 21 (22) includes a device-side mounting post 211 (221), engaging hooks 212 and 213 (222 and 223), and a stand-side mounting plate 214 (224).

In the device-side mounting post 211 (221), four holes 215a, 215b, 215c, and 215d (225a, 225b, 225c, and 225d) for attachment are formed at intervals in the vertical direction (see also FIG. 6A). As illustrated in FIG. 5A, the device-side mounting post 211 (221) is brought into contact with the back side 12 of the display 1 when the brackets 21 and 22 are attached to the display 1. When the bracket 21 (22) is attached to the display 1, screws are inserted into attachment holes 215a and 215d (225a and 225d) formed in the upper and lower ends of the device-side mounting post 211 (221).

Figure 8C:
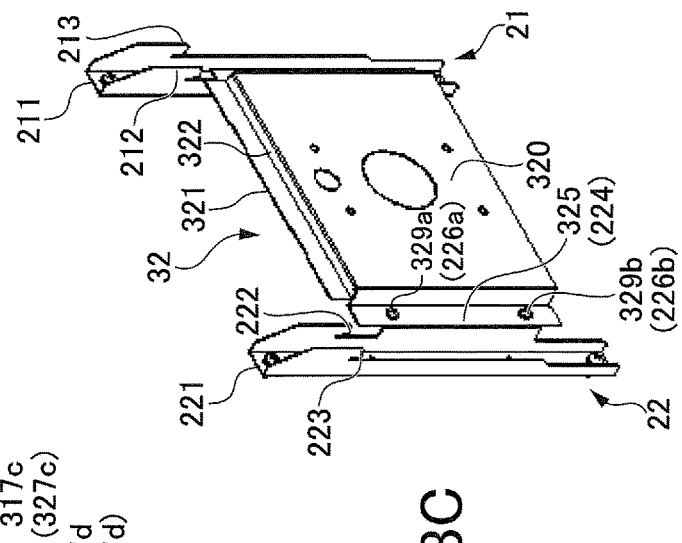
FIGS. 8A through 8C are drawings illustrating a stand system in a case where a rotary unit is not attached.
Figure 8B:
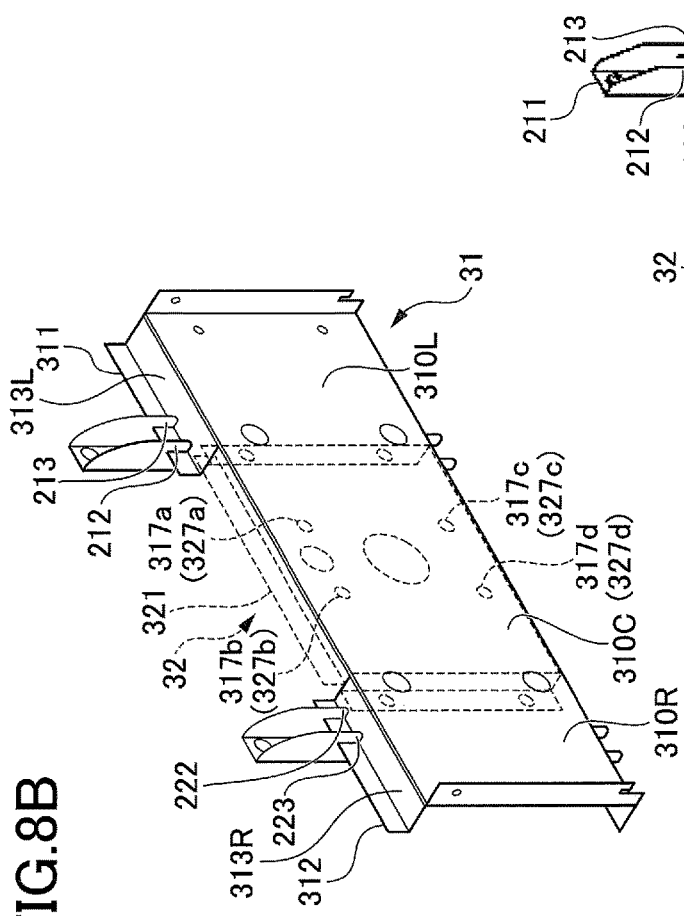
Figure 8A:
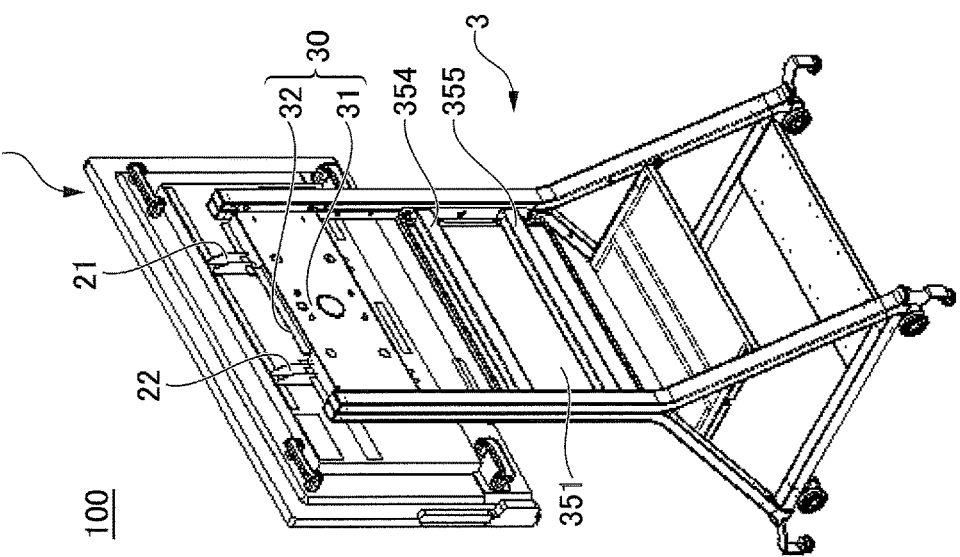

The stand mechanism 3 includes the mounting plate module 30 (31, 32), posts 33 and 34, reinforcing parts 351 through 355, lower bridges 36 and 37, casters 38a through 38d, and caster stoppers 39a through 39d (see also FIGS. 4A, 4B, and 8A).

The mounting plate module 30 includes a first mounting plate 31 on the back side for connecting the posts 33 and 34, and a second mounting plate 32 that is shorter than the first mounting plate 31 and attached to the front side of the first mounting plate 31.

An upper part of the post 33 (34) is an upper post 330 (340) that is a rod-shaped part extending substantially vertically, and a lower part of the post 33 (34) branches diagonally forward and backward into a front leg 331 (341) and a rear leg 332 (342). "Substantially vertically" may indicate a slightly oblique direction as well as a vertical direction.

Also, the reinforcing part 351 that is a reinforcing plate, the reinforcing part 352 that is a reinforcing rack, and the reinforcing part 353 that is a lower reinforcing plate are provided to connect the posts 33 and 34 and thereby reinforce the posts 33 and 34. Further, as illustrated in FIG. 8A, the reinforcing parts 354 and 355, which are reinforcing beams, are provided on the back side of the reinforcing part 351.

The lower bridge 36 (37) is provided to connect the lower ends of the front leg 331 (341) and the rear leg 332 (342).

Further, because the stand mechanism 3 includes the casters 38a through 38d on the lower end faces of the front legs 331 and 341 and the rear legs 332 and 342, the stand system 100 in the assembled state can be moved (or carried). To adjust the angle of the display 1 in the right and left directions, the orientation of the entire stand system 100 is adjusted using the casters 38a through 38d.

The caster stoppers 39a through 39d for restricting the movement of the casters 38a through 38d are provided at the lower ends of the front legs 331 and 341 and the rear legs 332 and 342. The front end faces of the caster stoppers 39a and 39b provided at the lower ends of the front legs 331 and 341 correspond to the front end FE that is the frontmost end of the stand mechanism 3 (see FIG. 4A).

The front legs 331 and 341, the rear legs 332 and 342, the lower bridges 36 and 37, the reinforcing part 352 that is a reinforcing rack, and the reinforcing part 353 that is a lower reinforcing plate in the lower part of the stand mechanism 3 function as a base for keeping the stand mechanism 3 in a standing position. Although not shown, a rear cover may be attached to the back side of the stand mechanism 3.

Next, the assembly of the stand system 100 illustrated in FIGS. 5A and 5B is described.

First, as illustrated in FIG. 5A, the attachment holes 215a and 215d formed in the device-side mounting post 211 of the bracket 21 are aligned with the screw holes 15a and 15c formed in the back side 12 of the display 1, and the bracket 21 is screwed to the display 1. Similarly, the attachment holes 225a and 225d formed in the device-side mounting post 221 of the bracket 22 are aligned with the screw holes 15b and 15d of the display 1, and the bracket 22 is screwed to the display 1. The configuration in which the right and left brackets 21 and 22 and the display 1 are joined together as described above is referred to as a bracket-equipped display 4.

Next, as illustrated in FIG. 5B, the engaging hooks 212 and 213 of the bracket 21 and the engaging hooks 222 and 223 of the bracket 22 are hung on (or engaged with) the upper ends of right and left first engaging parts 311 and 312 of the mounting plate module 30 and are thereby positioned. Then, the bracket-equipped display 4 is attached to the mounting plate module 30 of the stand mechanism 3 by screwing the stand-side mounting plates 214 and 224 of the brackets 21 and 22 to the mounting plate module 30. The details of this attachment are described later with reference to FIGS. 8A through 8C and FIG. 9.

(Case where Rotary Unit is Attached)

As illustrated in FIGS. 6A through 6C, when the display 1 is attached using the rotary unit 5, the brackets 21 and 22 are attached to the back side of the rotary unit 5, and then the brackets 21 and 22 are fitted to the mounting plate module 30.

When the brackets 21 and 22 are attached to the rotary unit 5, the device-side mounting posts 211 and 221 are brought into contact with the rotary unit 5. Screws are inserted into joint holes 215b, 215c, 225b, and 225c formed in the middle of the corresponding device-side mounting posts 211 and 221 to attach the brackets 21 and 22 to the rotary unit 5.

Joint holes 216a and 216b (226a and 226b) for attachment are formed in the stand-side mounting plate 214 (224). When the brackets 21 and 22 are attached to the stand mechanism 3, the stand-side mounting plates 214 and 224 are brought into contact with parts of the front side of the mounting plate module 30. Screws are inserted into the joint holes 216a, 216b, 226a, and 226b to attach the brackets 21 and 22 to the mounting plate module 30.

The rotary unit 5 includes a rotary unit movable part 51 and a rotary unit stationary part 52.

The rotary unit movable part 51 is fastened to the display 1 and rotates together with the display 1. The rotary unit stationary part 52 is fixed to the stand mechanism 3 and is not rotatable.

The rotary unit movable part 51 includes a mounting plate (movable plate) 510 shaped like a horizontal plate and device-side mounting posts 511 and 512 that are joined to the right and left ends of the mounting plate 510. Attachment holes 513a and 513b (514a and 514b) are formed in the device-side mounting post 511 (512). When the rotary unit movable part 51 is attached to the display 1, the device-side mounting posts 511 and 512 are brought into contact with the back side 12 of the display 1, and screws are inserted into the attachment holes 513a, 513b, 514a, and 514b.

The rotary unit stationary part 52 includes a rotary mechanism 520 and mounting thin parts 521 and 522 provided at the right and left ends of the rotary mechanism 520. Joint holes 523a and 523b for connection with the bracket 21 are formed in the mounting thin part 521. Joint holes 524a and 524b for connection with the bracket 22 are formed in the mounting thin part 522. The mounting thin parts 521 and 522 are screwed to the brackets 21 and 22.

The width of the rotary unit stationary part 52 is shorter than the width of the mounting plate 510 of the rotary unit movable part 51, and the rotary unit stationary part 52 is joined to the substantially central portion of the mounting plate 510 of the rotary unit movable part 51.

FIGS. 6A through 6C illustrate a configuration in which the rotary mechanism 520 enables the movable part of the rotary unit 5 to be manually rotated relative to the stationary part. Alternatively, the rotary unit 5 may be rotated automatically by power from a power source.

The assembly of the stand system 200 illustrated in FIGS. 6A through 6C is described.

First, as illustrated in FIG. 6A, the joint holes 215b and 215c formed in the middle of the device-side mounting post 211 of the bracket 21 are screwed from the back side to the joint holes 523a and 523b formed in the mounting thin part 521 of the rotary unit stationary part 52 of the rotary unit 5. Similarly, the joint holes 225b and 225c formed in the middle of the device-side mounting post 221 of the bracket 22 are screwed from the back side to the joint holes 524a and 524b of the mounting thin part 522 of the rotary unit stationary part 52. The structure formed by combining the right and left brackets 21 and 22 with the rotary unit 5 is referred to as a bracket-equipped rotary unit 6.

Next, as illustrated in FIG. 6B, the attachment holes 513a and 513b formed in the device-side mounting post 511 of the rotary unit movable part 51 are aligned with the screw holes 15a and 15c formed in the back side 12 of the display 1, the attachment holes 514a and 514b of the device-side mounting post 512 are aligned with the screw holes 15b and 15d, and the rotary unit movable part 51 is screwed to the display 1. The structure formed by combining the bracket-equipped rotary unit 6 with the display 1 is referred to as a rotary-unit-equipped display 7.

Then, as illustrated in FIG. 6C, the engaging hooks 212, 213, 222, and 223 of the brackets 21 and 22 of the rotary-unit-equipped display 7 are hung on (or engaged with) a second engaging part 321, which is the upper end of the second mounting plate 32 of the stand mechanism 3, to position the rotary-unit-equipped display 7, and then the brackets 21 and 22 are screwed to the mounting plate module 30. The details of this attachment are described later with reference to FIGS. 10A through 10C and FIG. 11.

With this configuration, after the components are initially assembled, the stand system 200 can be moved and the display 1 can be manually rotated without disassembling the components.

<Mounting Plate Module>

Figure 7A:
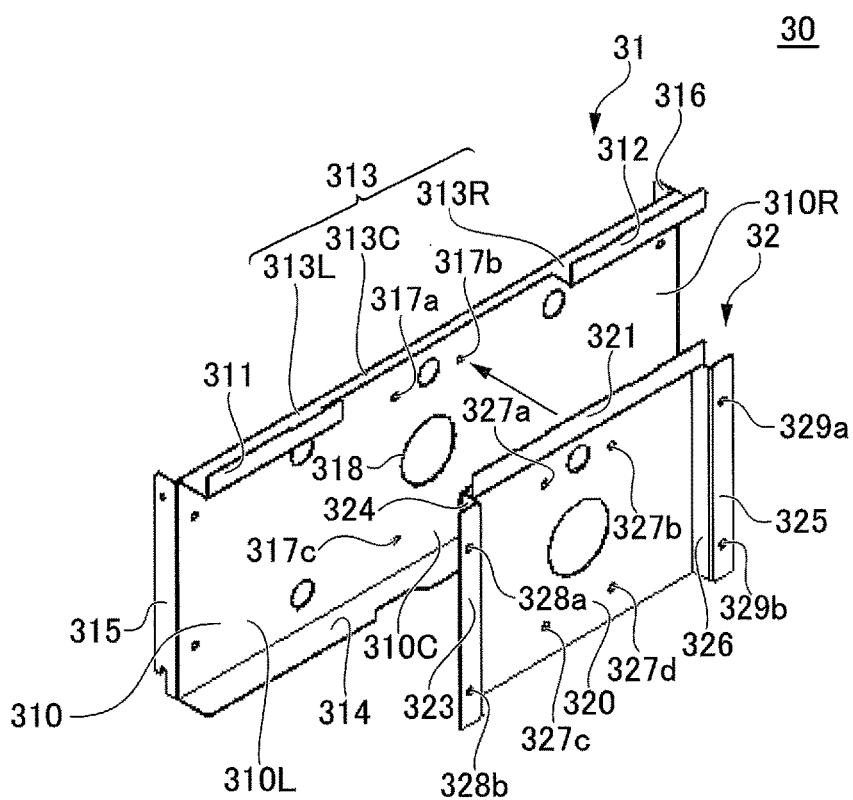
FIGS. 7A through 7C are drawings illustrating a mounting plate module.
Figure 7B:
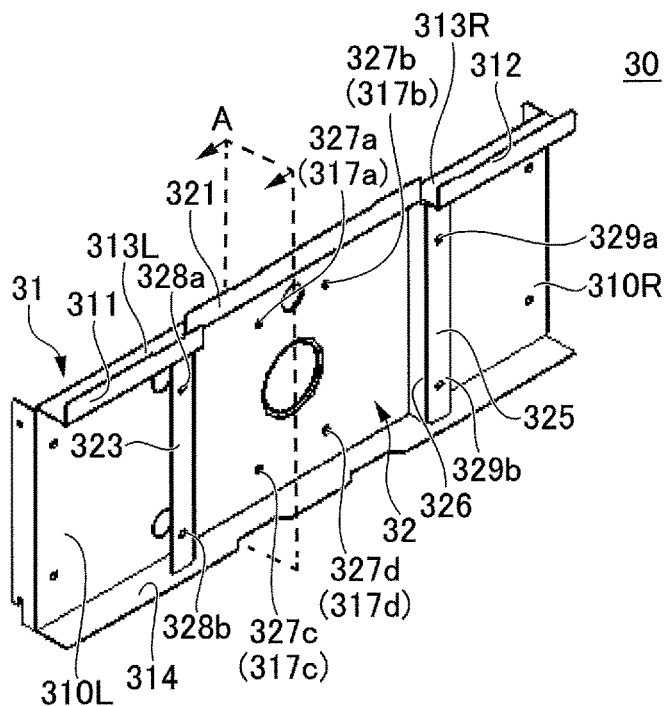
Figure 7C:
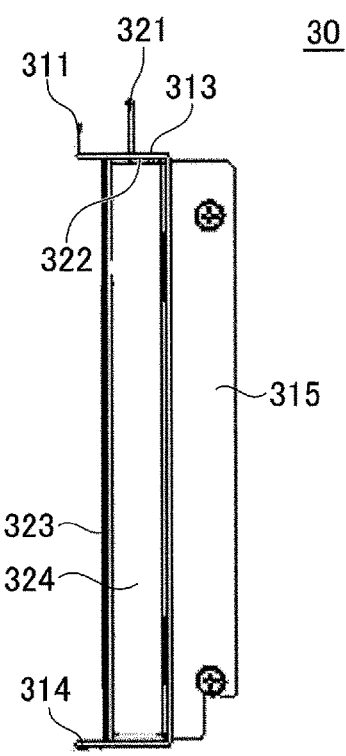

FIGS. 7A through 7C are drawings illustrating the mounting plate module 30 of the stand mechanism 3 of the present embodiment. FIG. 7A is an exploded perspective view, FIG. 7B is an overall perspective view, and FIG. 7C is a side cross-sectional view of the mounting plate module 30. FIG. 7C is a cross-sectional view taken along a plane A in FIG. 7B.

The mounting plate module 30 includes the first mounting plate 31 and the second mounting plate 32.

When the rotary unit 5 is not attached, the engaging hooks 212, 213, 222, and 223 of the brackets 21 and 22 are fitted to the first mounting plate 31 as illustrated in FIG. 5B.

When the rotary unit 5 is attached, the engaging hooks 212, 213, 222, and 223 of the brackets 21 and 22 are fitted to the second mounting plate 32 as illustrated in FIG. 6C.

The second mounting plate 32 is shorter than the first mounting plate 31 in the width direction. The mounting plate module 30 has an integral structure formed by welding the back side of the second mounting plate 32 to the central area of the front side of the first mounting plate 31 such that the first mounting plate 31 is in contact with the second mounting plate 32.

Specifically, the first mounting plate 31 includes a base plate 310, the first engaging parts 311 and 312, an upper-end long part 313, a lower-end long part 314, a left-end part 315, and a right-end part 316.

The upper-end long part 313 is a narrow plate-shaped part that is bent at the upper end of the base plate 310 at a substantially right angle and protrudes forward from the upper end of the base plate 310. The lower-end long part 314 is a narrow plate-shaped part that is bent at the lower end of the base plate 310 at a substantially right angle and protrudes forward from the lower end of the base plate 310.

As illustrated in FIG. 7A, the left part, the center part, and the right part of the base plate 310 are referred to as a left base plate 310L, a center base plate 310C, and a right base plate 310R, respectively. Holes 317a, 317b, 317c, and 317d for attachment are formed in the center base plate 310C.

Here, in the width direction of the mounting plate module 30, a region where the first mounting plate 31 and the second mounting plate 32 overlap each other is referred to as a central region, and regions other than the central region are referred to as end regions. In the first mounting plate 31, the center base plate 310C corresponds to the central region.

The left part, the center part, and the right part of the upper-end long part 313 are referred to as a left upper-end part 313L, a central upper-end part 313C, and a right upper-end part 313R, respectively. The left upper-end part 313L and the right upper-end part 313R function as two first upper-end parts. As illustrated in FIG. 7A, because the length in the depth direction of the central upper-end part 313C is shorter than the length in the depth direction of the right and left upper-end parts 313L and 313R, when seen from the front side, the front end of the central upper-end part 313C is recessed from the front ends of the right and left upper-end parts 313L and 313R.

The first engaging part 311 is a narrow plate-shaped part (plate-shaped protrusion) that is bent at the front end of the left upper-end part 313L at a substantially right angle and protrudes upward. The first engaging part 312 is a narrow plate-shaped part (plate-shaped protrusion) that is bent at the front end of the right upper-end part 313R at a substantially right angle and protrudes upward. The first engaging parts 311 and 312 and the right and left upper-end parts 313L and 313R form L-shaped angular parts that extend forward from the upper ends of the end regions of the first mounting plate 31 and then extend upward. In other words, the upper and lower ends of the first mounting plate 31 are protruding ends that are shaped like steps and protrude forward from the front side of the base plate 310.

With this configuration, a gap corresponding to the width of the central upper-end part 313C is formed between the two first engaging parts 311 and 312 in the width direction. Also, in the depth direction, the front ends of the right and left first engaging parts 311 and 312 are located further forward than the front end of the central upper-end part 313C.

The left-end part 315 and the right-end part 316 are narrow plate-shaped parts that are bent at the lateral ends of the base plate 310 at a substantially right angle and protrude backward from the lateral ends of the base plate 310. The left-end part 315 and the right-end part 316 are connected to the upper posts 330 and 340 of the stand mechanism 3.

In the first mounting plate 31, the central parts of the base plate 310, the central upper-end part 313C, and the lower-end long part 314 are components of the central region, and the other parts are components of the end regions.

The second mounting plate 32 includes a base plate 320, the second engaging part 321, a second upper-end part 322, a left strip-like plate (first screwed plate) 323, a left-end part 324, a right strip-like plate (first screwed plate) 325, and a right-end part 326. In the second mounting plate 32, the base plate 320, the second engaging part 321, and the second upper-end part 322 are components of the central region, and the left strip-like plate 323, the left-end part 324, the right strip-like plate 325, and the right-end part 326 are components of the end regions.

The upper end and the right and left ends of the second mounting plate 32 are protruding ends that are shaped like steps and protrude forward from the front side of the base plate 320. Specifically, the second upper-end part 322, the left-end part 324, and the right-end part 326 are narrow plate-shaped parts that are bent at the ends of the base plate 320 at a substantially right angle and protrude forward from the ends of the base plate 320.

The second engaging part 321 is a narrow plate-shaped part (plate-shaped protrusion) that is bent at the front end of the second upper-end part 322 at a substantially right angle and protrudes upward.

Here, the amount of forward protrusion of the second upper-end part 322 of the second mounting plate 32 is less than the amount of forward protrusion of each of the upper-end parts (first upper-end parts) 313R and 313L in the end regions of the first mounting plate 31. Also, the amount of forward protrusion of the second upper-end part 322 is substantially the same as the length in the depth direction of the central upper-end part 313C in the central region of the first mounting plate 31.

As illustrated in FIG. 7B and FIG. 7C, the second engaging part 321 a plate-shaped protrusion that is bent at the front end of the second upper-end part 322, and the first engaging parts 311 and 312 are plate-shaped protrusions that are bent at the upper ends of the two first upper-end parts 313R and 313L. Accordingly, the first engaging parts 311 and 312 are located further forward than the second engaging part 321.

That is, the second engaging part 321, which corresponds to an attachment position at which the display 1 is attached to the mounting plate module 30 via the rotary unit 5, is located further backward than the first engaging parts 311 and 312 corresponding to an attachment position at which the display 1 is attached to the mounting plate module 30 without the rotary unit 5.

The left strip-like plate 323 is a narrow plate-shaped part that is bent at the front end of the left-end part 324 at a substantially right angle and protrudes outward to the left. The right strip-like plate 325 is a narrow plate-shaped part that is bent at the front end of the right-end part 326 at a substantially right angle and protrudes outward to the right.

Here, the base plate 320 is a second screwed plate to which the brackets 21 and 22 are screwed when the rotary unit 5 is used, and the left strip-like plate 323 and the right strip-like plate 325 are first screwed plates to which the brackets 21 and 22 are screwed when the rotary unit 5 is not used.

Specifically, four holes 327a, 327b, 327c, and 327d are formed in the base plate 320. When the second mounting plate 32 is welded to the first mounting plate 31, the holes 317a, 317b, 317c, and 317d formed in the base plate 310 are aligned with the holes 327a, 327b, 327c, and 327d formed in the base plate 320, and four through holes passing through the mounting plate module 30 in the front and back direction are formed.

These holes 317a, 317b, 317c, 317d, 327a, 327b, 327c, and 327d are used to fasten the brackets 21 and 22 when the display 1 is attached via the rotary unit 5.

Holes 328a and 328b are formed in the left strip-like plate 323, and holes 329a and 329b are formed in the right strip-like plate 325.

The left strip-like plate 323 and the right strip-like plate 325, in which the holes 328a, 328b, 329a, and 329b are formed, are used to fasten the brackets 21 and 22 when the display 1 is attached without the rotary unit 5.

<Attachment of Brackets>
(Without Rotary Unit)

Figure 9:
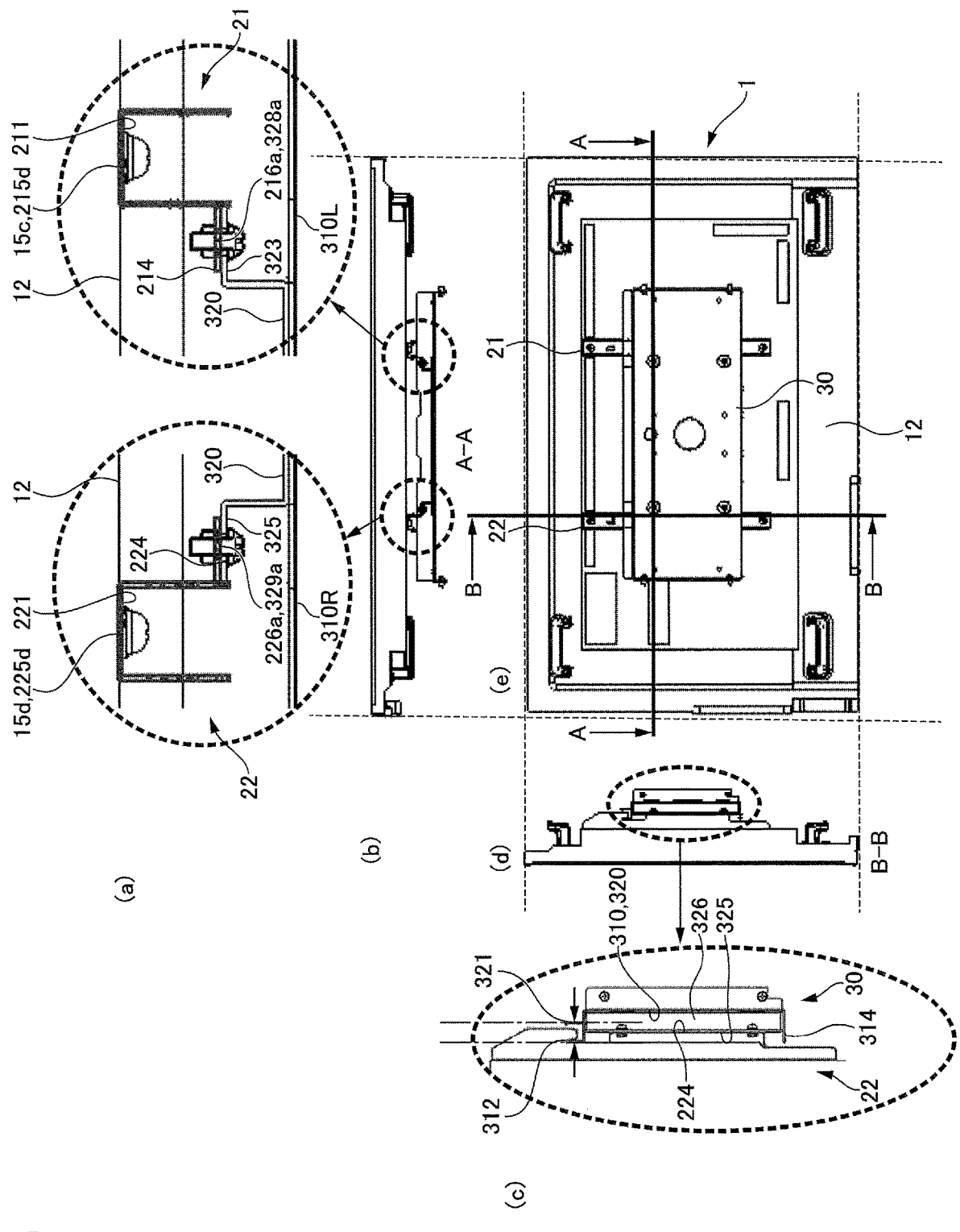
FIG. 9 is a drawing illustrating a display, a mounting plate module, and brackets in a case where a rotary unit is not attached.

FIGS. 8A through 8C are rear perspective views of the stand system 100 of the present embodiment in the case where the rotary unit 5 is not attached. FIG. 9 is a drawing illustrating the display 1, the mounting plate module 30, and the brackets 21 and 22 of the present embodiment in the case where the rotary unit 5 is not attached.

FIG. 8A is a rear perspective view of the entire stand system 100, FIG. 8B is a rear perspective view of the mounting plate module 30 to which the brackets 21 and 22 are attached, and FIG. 8C is a rear perspective view of the second mounting plate 32 to which the brackets 21 and 22 are screwed.

In FIG. 9, (a) is an enlarged horizontal cross-sectional view, (b) is a horizontal cross-sectional view, (c) is an enlarged vertical cross-sectional view, (d) is a vertical cross-sectional view, and (e) is a rear view of the display 1 where components are attached to the back side 12. FIG. 9 (b) is a cross-sectional view taken along line A-A of FIG. 9 (e), and FIG. 9 (d) is a cross-sectional view taken along line B-B of FIG. 9 (e).

When assembling the bracket-equipped display 4 that is to be attached without the rotary unit 5, a pair of brackets 21 are 22 are attached to the back side 12 of the display 1 at positions that are slightly away from the center of the back side 12 and are apart from each other in the right and left directions (see FIG. 5A, FIG. 8A, FIG. 9 (b), and FIG. 9 (e)).

In this case, the upper and lower attachment holes 215a and 215d formed in the device-side mounting post 211 of the bracket 21 are aligned with the screw holes 15a and 15c formed in the back side 12 of the display 1, and the bracket 21 is screwed to the display 1. Similarly, the attachment holes 225a and 225d formed in the device-side mounting post 221 of the bracket 22 are aligned with the screw holes 15b and 15d, and the bracket 22 is screwed to the display 1 (see FIG. 5A and FIG. 9(a)).

When attaching the bracket-equipped display 4 to the mounting plate module 30, the engaging hooks 212, 213, 222, and 223 of the brackets 21 and 22 are hung on (or engaged with) the upper ends of the first engaging parts 311 and 312 located in the end regions of the first mounting plate 31 that are outside of the central region where the base plate 320 of the second mounting plate 32 is present (see FIGS. 8B and 8C).

Then, as illustrated in FIG. 8C and FIG. 9 (a), the joint holes 216a and 216b of the stand-side mounting plate 214 of the bracket 21 are aligned with the mounting holes 328a and 328b, the joint holes 226a and 226b of the stand-side mounting plate 224 of the bracket 22 are aligned with the mounting holes 329a and 329b, and the brackets 21 and 22 are screwed to the second mounting plate 32.

(With Rotary Unit)

Figure 10A:
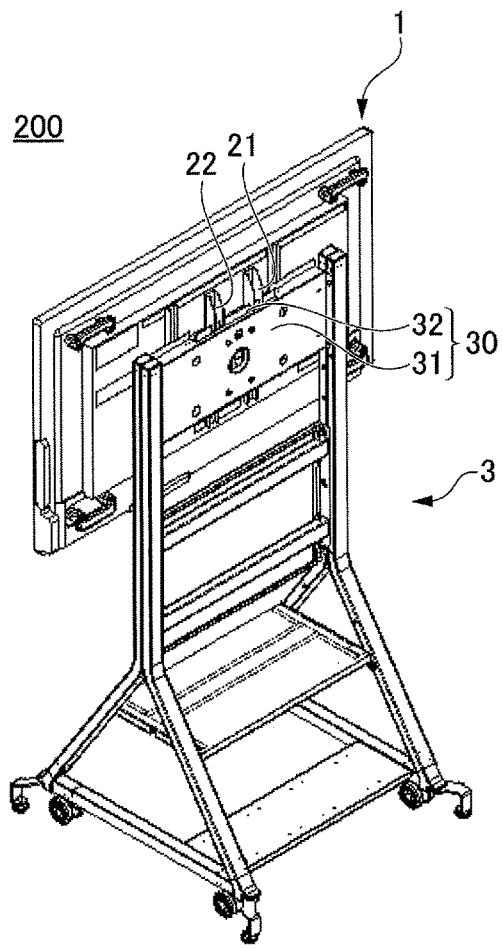
FIGS. 10A through 10C are drawings illustrating a stand system in a case where a rotary unit is attached.
Figure 10B:
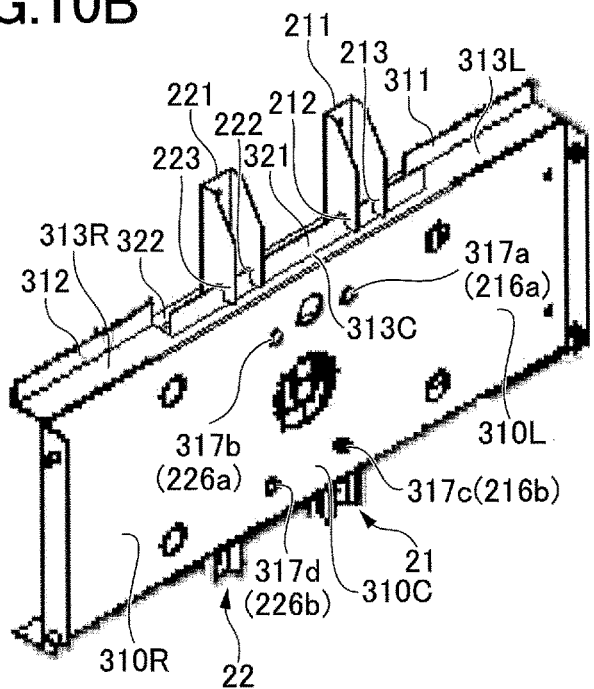
Figure 10C:
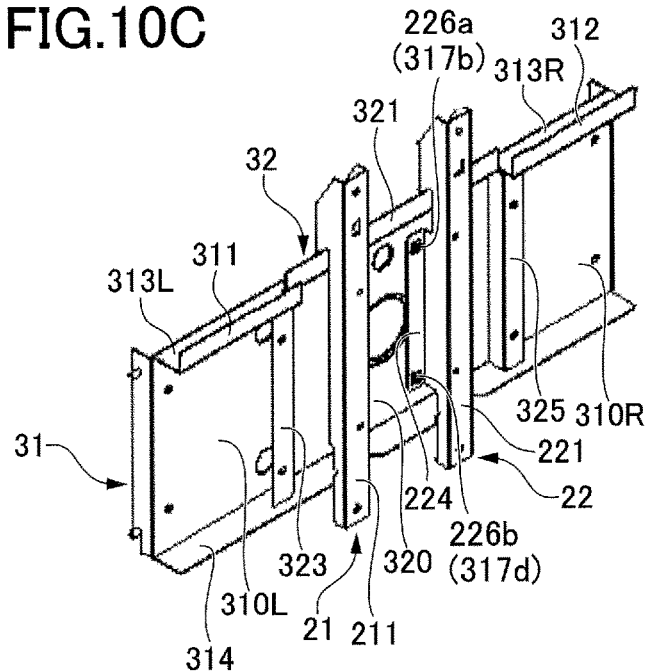
Figure 11:
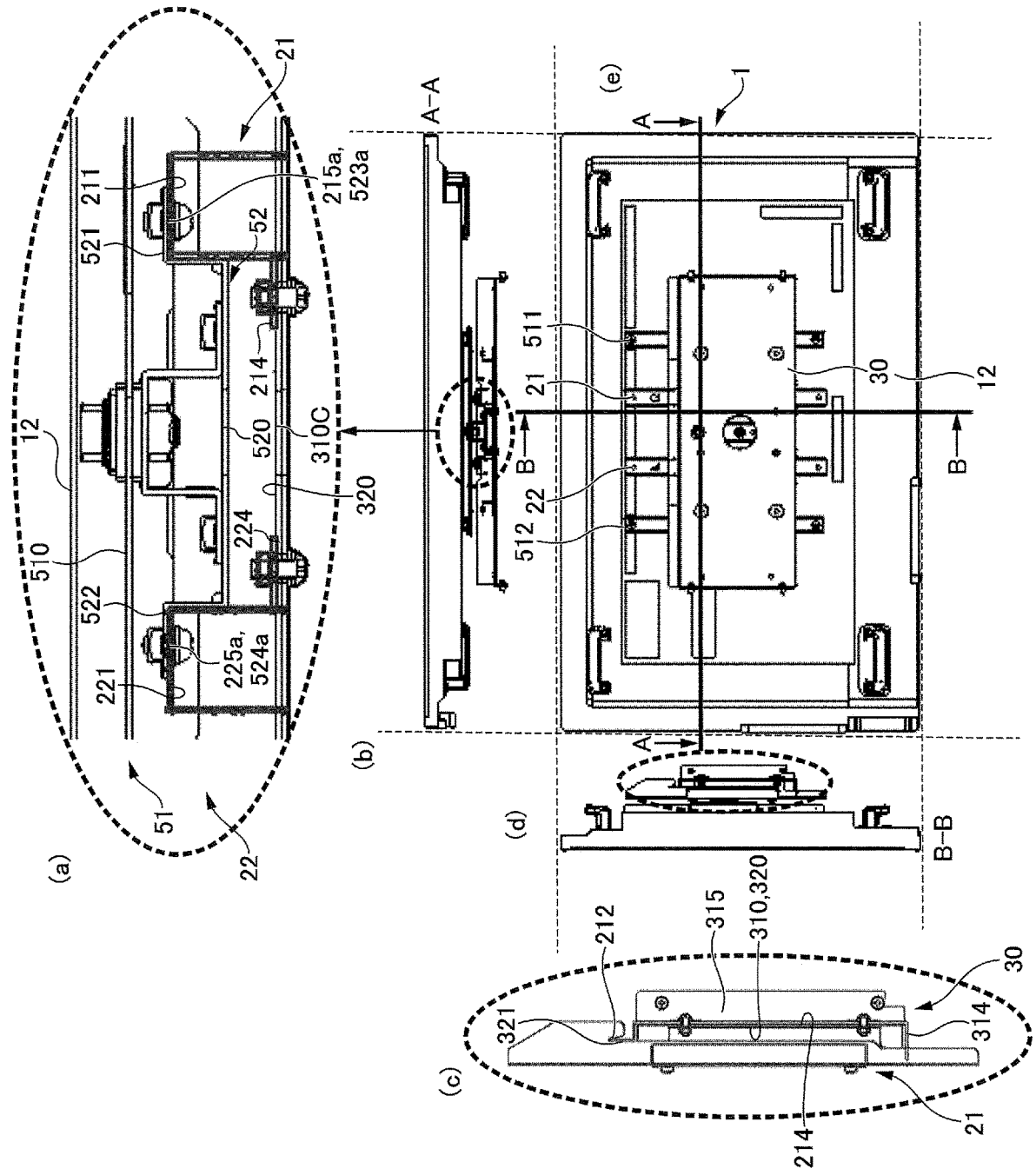
FIG. 11 is a drawing illustrating a display, a mounting plate module, brackets, and a rotary unit in a case where the rotary unit is attached.

FIGS. 10A through 10C are perspective views of the stand system 200 of the present embodiment in the case where the rotary unit 5 is attached. FIG. 11 is a drawing illustrating the display 1, the mounting plate module 30, the brackets 21 and 22, and the rotary unit 5 of the present embodiment in the case where the rotary unit 5 is attached.

FIG. 10A is a rear perspective view of the entire stand system 200, FIG. 10B is a rear perspective view of the mounting plate module 30 to which the brackets 21 and 22 are attached, and FIG. 10C is a front perspective view of the mounting plate module 30 to which the brackets 21 and 22 are attached.

In FIG. 11, (a) is an enlarged cross-sectional view, (b) is a horizontal cross-sectional view, (c) is an enlarged vertical cross-sectional view, (d) is a vertical cross-sectional view, and (e) is a rear view of the display 1 where components are attached to the back side 12. FIG. 11 (b) is a cross-sectional view taken along line A-A of FIG. 11 (e), and FIG. 11 (d) is a cross-sectional view taken along line B-B of FIG. 11 (e).

First, when assembling the bracket-equipped rotary unit 6 for attaching the display 1 via the rotary unit 5, the center joint holes 215b and 215c formed in the device-side mounting post 211 of the bracket 21 are aligned with the joint holes 523a and 523b formed in the rotary unit stationary part 52, and the bracket 21 is screwed to the rotary unit stationary part 52. Similarly, the center joint holes 225b and 225c formed in the device-side mounting post 221 of the bracket 22 are aligned with the joint holes 524a and 524b of the rotary unit stationary part 52, and the bracket 22 is screwed to the rotary unit stationary part 52 (see FIG. 6A and FIG. 11 (a)).

Then, when attaching the bracket-equipped rotary unit 6 to the display 1 to assemble the rotary-unit-equipped display 7, the device-side mounting posts 511 and 512 of the rotary unit movable part 51 are attached to the back side 12 of the display 1 at positions that are located slightly away from the center of the back side 12 (see FIG. 6B, FIG. 10A, FIG. 11 (b), and FIG. 11 (e)).

Here, as illustrated in FIG. 11 (e), on the back side 12, the device-side mounting post 511 of the rotary unit 5, the brackets 21 and 22, and the device-side mounting post 512 of the rotary unit 5 are arranged in this order from the right side.

When the rotary unit 5 is not attached, the brackets 21 and 22 are attached to the screw holes 15a through 15d that are formed in the back side 12 of the display 1 in regions away from the center of the back side 12. On the other hand, when the display 1 is attached via the rotary unit 5, the device-side mounting posts 511 and 512 of the rotary unit 5 are attached to the screw holes 15a through 15d, and the brackets 21 and 22 are attached to the rotary unit 5 in regions closer to the center of the back side 12.

Comparing FIG. 9 (e), FIG. 11 (b), and FIG. 11 (e), in the case of FIG. 9 (e), a pair of brackets 21 and 22 are attached to the back side 12 of the display 1 at positions that are apart from each other in the lateral direction and are located outside of a central portion of the display 1 where the rotary unit stationary part 52 is placed in the case of FIG. 11 (e).

Thus, the brackets 21 and 22 in the case of FIG. 9 (e) are located further from the center of the back side 12 of the display 1 than in the case of FIG. 11 (e).

Accordingly, the brackets 21 and 22 located closer to the ends of the display 1 as illustrated in FIG. 9 are fastened to the end regions of the mounting plate module 30 as illustrated in FIGS. 8A through 8C. On the other hand, the brackets 21 and 22 located closer to the center of the display 1 as illustrated in FIG. 11 are fastened to the central region of mounting plate module 30 as illustrated in FIGS. 10A through 10C.

When attaching the rotary-unit-equipped display 7 to the mounting plate module 30 as in this example, the engaging hooks 212, 213, 222, and 223 of the brackets 21 and 22 are hung on and engaged with the upper end of the second engaging part 321 located above the base plate 320 of the second mounting plate 32 in the central region (see FIGS. 10B and 10C).

Then, as illustrated in FIG. 10C and FIG. 11 (a), the joint holes 216a and 216b of the stand-side mounting plate 214 of the bracket 21 are aligned with the holes 317a and 317c (327a and 327c) of the base plate 310 (320) in the central region, and the stand-side mounting plate 214 is screwed to the mounting plate module 30. Similarly, the joint holes 226a and 226b of the stand-side mounting plate 224 of the bracket 22 are aligned with the holes 317b and 317d (327b and 327d) in the central region, and the stand-side mounting plate 224 is screwed to the mounting plate module 30.

Here, as illustrated in FIG. 9 (c) and FIG. 11 (c), in the second mounting plate 32, the left strip-like plate 323 and the right strip-like plate 325 are disposed further forward than the base plate 320 by an amount corresponding to the left-end part 324 and the right-end part 326.

To attach the brackets 21 and 22 to the mounting plate module 30 horizontally, the width of each of the left-end part 324 and the right-end part 326 in the depth direction is substantially the same as the distance between the front end face of each of the first engaging parts 311 and 312 and the front end face of the second engaging part 321.

With this configuration, the distance between the first engaging parts 311 and 312 and the left-end part 324 and the right-end part 326 in the depth direction is substantially the same as the distance between the second engaging part 321 and the base plate 320. Because the brackets 21 and 22 of the same size are used regardless of whether the rotary unit 5 is attached, the brackets 21 and 22 can be attached to the mounting plate module 30 with the same stability regardless of whether the rotary unit 5 is attached.

In the present embodiment, four screw holes 15a through 15d (two rows and two columns of screw holes) are formed in the back side 12 of the display 1. However, the number of screw holes may be any even number greater than or equal to four. For example, a total of six screw holes may be formed by symmetrically arranging right and left columns of three screw holes, or a total of eight screw holes may be formed by arranging 2×2=4 screw holes on the right and left sides. The number of holes formed in each of the brackets, the mounting plates, and the rotary unit is preferably adjusted according to the number of screw holes in the display 1.

In the above embodiment, a pair of right and left brackets 21 and 22 are provided. However, the number of brackets may also be any even number greater than or equal to four as long as the number of brackets provided on the right side is the same as the number of brackets provided on the left side. In such a case, the number of holes formed in each of the brackets, the mounting plates, and the rotary unit and the number of screw holes in the display 1 are preferably adjusted as necessary.

(Positions in Depth Direction)

Figure 12:
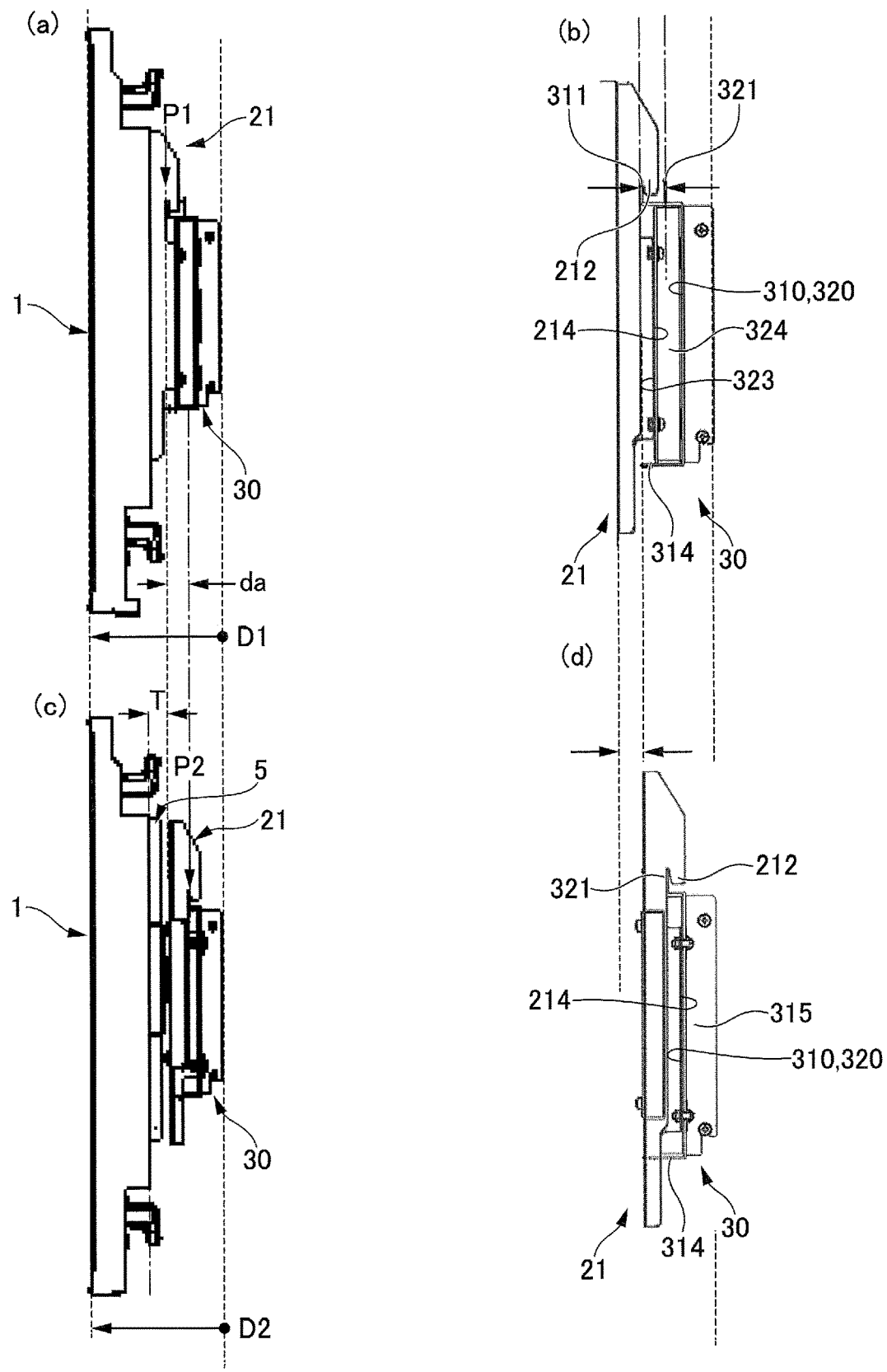
FIG. 12 is a drawing illustrating bracket attaching positions on a mounting plate module in cases where a rotary unit is attached and not attached.

FIG. 12 is a drawing illustrating bracket attaching positions in cases where the rotary unit 5 is attached and not attached.

FIG. 12 (a) and FIG. 12 (b) illustrate a case where the rotary unit is not attached. FIG. 12 (a) is a vertical cross-sectional view of the display, the bracket, and the mounting plate module; and FIG. 12 (b) is a vertical cross-sectional view of the bracket and the mounting plate module. FIG. 12 (c) and FIG. 12 (d) illustrate a case where the rotary unit is attached. FIG. 12 (c) is a vertical cross-sectional view of the display, the rotary unit, the bracket, and the mounting plate module; and FIG. 12 (d) is a vertical cross-sectional view of the bracket and the mounting plate module.

As illustrated in FIG. 12 (a) and FIG. 12 (c), in the present embodiment, a thickness T of the rotary unit 5 is substantially the same as a distance da between the front end face of each of the first engaging parts 311 and 312 and the front end face of the second engaging part 321. With this configuration, the thickness T of the rotary unit 5 also becomes substantially the same as the width of each of the left-end part 324 and the right-end part 326 in the depth direction.

With the dimensions of components set as described above, although the distance from the mounting position P2 to the display 1 increases by an amount corresponding to the thickness of the rotary unit 5 when the rotary unit 5 is attached, because the mounting position P2 is located further backward than the mounting position P1, the distance between the rearmost end of the mounting plate module 30 and the front end of display 1 in the depth direction is the same regardless of whether the rotary unit 5 is attached (D1=D2 in FIG. 12).

With this configuration, as illustrated in FIGS. 4A and 4B, the position of the display screen relative to the stand in the case where the rotary unit 5 is attached is the same as that in the case where the rotary unit 5 is not attached (X1=X2).

Thus, because the position of the display 1 in the depth direction is not shifted regardless of presence or absence of the rotary unit 5, the centroid positions CP1 and CP2 are the same as illustrated in FIGS. 4A and 4B, and the distances L1 and L2 between the front end FE and the centroid positions CP1 and CP2 are also the same.

Because the centroid position does not change when the rotary unit 5 is attached as illustrated in FIGS. 4A and 4B, even when the distance L1 is set at the smallest possible value to suit the case where the rotary unit 5 is not attached, the relationships L1>0.2H and L2>0.2H can be satisfied. Accordingly, the stability of the display stand can be maintained even when the rotary unit 5 is attached.

(Variation)

In the above embodiment, the mounting plate module 30 of the stand mechanism 3 has a two-stage structure. That is, the mounting plate module 30 includes the first engaging parts 311 and 312 and the second engaging part 321 that are located in two different positions in the depth direction, and the first screwed plates 323 and 325 and the second screwed plate (base plate) 320 that are located in two different positions in the depth direction, so that the position of the display screen relative to the stand in the case where the rotary unit is attached becomes the same as that in the case where the rotary unit is not attached (X2≈X1). Alternatively, the brackets may be configured to have a two-stage structure.

Specifically, each bracket may be configured to include hooks at two different positions in the depth direction and mounting plates at two different positions in the depth direction, and the mounting plate module may be configured to include a common engaging part, so that the position of the display screen relative to the stand in the case where the rotary unit is attached becomes the same as that in the case where the rotary unit is not attached (X2≈X1).

A stand and a stand system according to the embodiment of the present invention are described above. However, the present invention is not limited to the specifically disclosed embodiment, and variations and modifications may be made without departing from the scope of the present invention.

What is claimed is:

1. A stand for supporting a display device, the stand comprising:
multiple posts; and
a mounting plate module that includes a first engaging part, and a second engaging part, the first and second engaging parts being engageable with a bracket, and the mounting plate module being configured to
connect the multiple posts to each other, and
be attachable to and detachable from the display device via a rotary unit configured to enable manually changing an orientation of the display device between a landscape orientation and a portrait orientation without detaching and reattaching the display device from the stand, or
be attachable to and detachable from the display device without the rotary unit, wherein
a position of the display device relative to the stand in a depth direction in a state where the display device is attached to the mounting plate module via the rotary unit is the same as the position of the display device relative to the stand in the depth direction in a state where the display device is attached to the mounting plate module without the rotary unit,
the first engaging part is configured to engage with the bracket at a first attachment position in a case where the display device is attached to the mounting plate module without the rotary unit,
the second engaging part is configured to engage with the bracket at a second attachment position in a case where the display device is attached to the mounting plate module via the rotary unit, and
the second attachment position is located further backward than the first attachment position while the display device is maintained at the same position relative to the depth direction of the stand, and the second engaging part is located further backward than the first engaging part.

2. The stand as claimed in claim 1, wherein
the bracket is a plurality of brackets, each bracket of the plurality of brackets including a back side configured to be fitted to the mounting plate module and a front side that is attachable to either the display device or the rotary unit,
wherein the stand is configured such that
in a case where the display device is attached to the mounting plate module without the rotary unit, the plurality of brackets is attached to a back side of the display device and are then fitted to the mounting plate module, and
in a case where the display device is attached to the mounting plate module via the rotary unit, the plurality of brackets is attached to a back side of the rotary unit and are then fitted to the mounting plate module.

3. The stand as claimed in claim 2, wherein
the first engaging part and the second engaging part are engageable with the plurality of brackets;
the stand is configured such that
in a case where the display device is attached to the mounting plate module without the rotary unit, the plurality of brackets is engaged with the first engaging part, and
in a case where the display device is attached to the mounting plate module via the rotary unit, the plurality of brackets is engaged with the second engaging par.

4. The stand as claimed in claim 3, wherein
the mounting plate module further includes a mounting plate, two first upper-end parts extending forward from upper ends of end regions of the mounting plate, and a second upper-end part extending forward from an upper end of a central region of the mounting plate;
the first engaging part includes two plate-shaped protrusions that protrude upward from front ends of the first upper-end parts;
the second engaging part includes a plate-shaped protrusion that protrudes upward from a front end of the second upper-end part; and
the first upper-end parts are longer than the second upper-end part in the depth direction, and the first engaging part is located further forward than the second engaging part.

5. The stand as claimed in claim 2, wherein
the plurality of brackets includes a pair of right and left brackets; and
in a case where the display device is attached to the mounting plate module without the rotary unit,
front sides of the right and left brackets are attached to the back side of the display device at positions that are away from a center of the back side of the display device in right and left directions, and
back sides of the right and left brackets are attached to end regions of the mounting plate module.

6. The stand as claimed in claim 2, wherein
in a case where the display device is attached to the mounting plate module via the rotary unit, and the rotary unit includes
a movable part that is fastened to the display device and configured to rotate along with the display device, the movable part including a movable plate and mounting posts joined to right and left ends of the movable plate, and
a non-rotating stationary part that is fastened to the mounting plate module, that is shorter than the movable part in a height direction, and that is joined to a central portion of the movable plate of the movable part,
the mounting posts of the movable part are attached to the back side of the display device at positions that are away from a center of the back side of the display device in right and left directions,
the front sides of the plurality of brackets of the stand are attached to a back side of the non-rotating stationary part, and
the back sides of the plurality of brackets of the stand are fitted to a central region of the mounting plate module.

7. The stand as claimed in claim 2, wherein
the mounting plate module includes
a first mounting plate, and
a second mounting plate that is disposed in front of the first mounting plate and is shorter than the first mounting plate in a height direction;
the second mounting plate includes
a base plate welded to a central region of the first mounting plate, and
right and left protruding ends that are shaped like steps and that protrude forward from right and left ends of the base plate;

in a case where the display device is attached to the mounting plate module via the rotary unit, parts of the plurality of brackets are screwed to the central region; and in a case where the display device is attached to the mounting plate module without the rotary unit, parts of the plurality of brackets are screwed to the right and left protruding ends.

8. The stand as claimed in claim 1, wherein the posts include rod-shaped parts extending substantially vertically and a base constituted by lower end portions of the posts; and a position in the depth direction of a front side of the display device relative to a front end of the base is the same in both of the state where the display device is attached to the mounting plate module via the rotary unit and the state where the display device is attached to the mounting plate module without the rotary unit.

9. The stand as claimed in claim 1, wherein the bracket has a back side that is attachable to the mounting plate module and a front side that is attachable to either the display device or the rotary unit.

10. A display device stand system, comprising:

a display device; and a stand configured to support the display device, wherein the stand includes multiple posts, and a mounting plate module that includes a first engaging part, and a second engaging part, the first and second engaging parts being engageable with a bracket, and the mounting plate module being configured to connect the multiple posts to each other; and be attachable to and detachable from the display device via a rotary unit configured to enable manually changing an orientation of the display device between a landscape orientation and a portrait orientation without detaching and reattaching the display device from the stand, or be attachable to and detachable from the display device without the rotary unit, a position of the display device relative to the stand in a depth direction in a state where the display device is attached to the mounting plate module via the rotary unit is the same as the position of the display device relative to the stand in the depth direction in a state where the display device is attached to the mounting plate module without the rotary unit, the first engaging part is configured to engage with the bracket at a first attachment position in a case where the display device is attached to the mounting plate module without the rotary unit, the second engaging part is configured to engage with the bracket at a second attachment position in a case where the display device is attached to the mounting plate module via the rotary unit, and the second attachment position is located further backward than the first attachment position while the display device is maintained at the same position relative to the depth direction of the stand, and the second engaging part is located further backward than the first engaging part.

11. A stand for supporting a display device, the stand comprising:

multiple posts;

a mounting plate module; and a plurality of brackets, wherein the mounting plate module includes a first engaging part and a second engaging part that are engageable with the plurality brackets, the second engaging part being located further backward relative to the depth direction of the stand than the first engaging part;

is configured to connect the multiple posts to each other; and is configured to be attachable to and detachable from the display device via a rotary unit configured to enable manually changing an orientation of the display device between a landscape orientation and a portrait orientation without detaching and reattaching the display device from the stand; or is configured to be attachable to and detachable from the display device without the rotary unit, each bracket of the plurality of brackets includes a back side configured to be fitted to the mounting plate module and a front side that is attachable to either the display device or a rotary unit, and the stand is configured such that in a case where the display device is attached to the mounting plate module without the rotary unit, the brackets are attached to a back side of the display device and are then fitted to the mounting plate module, and the brackets are engaged with the first engaging part;

in a case where the display device is attached to the mounting plate module via the rotary unit, the brackets are attached to a back side of the rotary unit and are then fitted to the mounting plate module, and the brackets are engaged with the second engaging part;

a position of the display device relative to the stand in a depth direction in a state where the display device is attached to the mounting plate module via the rotary unit is the same as the position of the display device relative to the stand in the depth direction in a state where the display device is attached to the mounting plate module without the rotary unit; and a first attachment position, at which the display device is attached to the mounting plate module via the rotary unit, is located further backward than a second attachment position, at which the display device is attached to the mounting plate module without the rotary unit, while the display device is maintained at the same position relative to the depth direction of the stand.

\* \* \* \* \*